United States Patent [19]

Saito et al.

[11] 4,395,744
[45] Jul. 26, 1983

[54] DISC-SHAPED RECORDING MEDIUM REPRODUCING APPARATUS

[75] Inventors: Takashi Saito, Ayase; Toshio Hirano, Atsugi; Takashi Kumaki, Sagamihara, all of Japan

[73] Assignee: Victor Company of Japan, Ltd., Yokohama, Japan

[21] Appl. No.: 288,292

[22] Filed: Jul. 30, 1981

[30] Foreign Application Priority Data

Jul. 31, 1980 [JP] Japan .......................... 55-108488[U]
Jul. 31, 1980 [JP] Japan .............................. 55-108489

[51] Int. Cl.³ .................... G11B 23/04; G11B 17/04; G11B 25/04
[52] U.S. Cl. ..................................... 360/97; 360/133; 206/444
[58] Field of Search ..................... 360/97, 99, 133, 86, 360/135, 137; 206/444, 309, 312; 369/77

[56] References Cited

U.S. PATENT DOCUMENTS

| | | | |
|---|---|---|---|
| 4,113,262 | 9/1978 | DeStephanis | 360/97 |
| 4,138,703 | 2/1979 | Stave et al. | 360/133 |
| 4,164,782 | 8/1979 | Stewart | 360/97 |
| 4,239,108 | 12/1980 | Coleman et al. | 360/133 |
| 4,239,238 | 12/1980 | Coleman | 360/86 |

Primary Examiner—Alfred H. Eddleman
Attorney, Agent, or Firm—Louis Bernat

[57] ABSTRACT

A reproducing apparatus reproduces a disc-shaped recording medium which is accommodated within a case. The case comprises a jacket which has a space for accommodating the disc-shaped recording medium and an opening for allowing the disc-shaped recording medium to go in and out of the jacket, and a lid member inserted through the opening of the jacket for closing the opening of the jacket. The reproducing apparatus comprises an inserting opening part through which the case is inserted into the reproducing apparatus, a turntable for rotating the disc-shaped recording medium, lid member locking mechanism and disc-shaped recording medium clamping mechanism respectively provided at the innermost part of the reproducing apparatus opposite to the inserting opening with respect to the turntable, jacket opening enlarging mechanism provided in the vicinity of the inserting opening, moving over the turntable between the position in the vicinity of the inserting opening and the innermost part of the reproducing apparatus, accompanied by operation of inserting the case into and pulling the same from the reproducing apparatus, and an elevating mechanism for moving a member for supporting the disc-shaped recording medium upwards and downwards independent of the turntable.

8 Claims, 9 Drawing Figures

DISC-SHAPED RECORDING MEDIUM REPRODUCING APPARATUS

BACKGROUND OF THE INVENTION

The present invention generally relates to disc-shaped recording medium reproducing apparatuses, and more particularly to a disc-shaped recording medium reproducing apparatus capable of placing and leaving a disc-shaped information recording medium in a state possible for reproduction within the reproducing apparatus when a case having a lid for accommodating the recording medium therein is inserted into and then pulled out from within the reproducing apparatus, and also capable of incasing the recording medium within the case so that the recording medium can be obtained outside the reproducing apparatus together with the case, when the empty case is inserted into and then pulled out from within the reproducing apparatus. The present invention further and especially relates to the above reproducing apparatus in which a locking mechanism is provided, for locking a disc lifter elevating lever at a rotated position thereof, which elevating lever, responsive to insertion of the disc case with or without the lid into the reproducing apparatus, rotates to move the disc lifter downwards to retreate from the insertion passage of the disc case.

Conventionally, in an apparatus for reproducing a disc-shaped recording medium (referring to video disc, PCM audio disc, and the like, and hereinafter simply referred to as a disc), there are types of apparatuses in which a disc is reproduced when the disc is loaded upon holding and placing of the disc within the reproducing apparatus, by inserting into and then pulling out a disc case which has a lid and accommodates a disc therein, from within the reproducing apparatus. As a conventional apparatus of this type, there is an apparatus which cooperates with a disc case comprising a rigid jacket for accommodating a disc, and a tray having a front part which is engaged by engaging means upon complete insertion of the disc case within the reproducing apparatus and an annular or ring portion fixed to the front part for encircling the outer periphery of the disc. This conventional reproducing apparatus is constructed so that when this disc case is inserted within the reproducing apparatus to a predetermined position, the engaging means of the reproducing appratus engages to and holds onto the front part of the tray. Hence, when the jacket is pulled out from within the reproducing apparatus, the disc is held by the annular portion of the tray and relatively slipped out from the jacket at the above predetermined position, and the outer peripheral edge part of the disc rests on and is supported by a supporting mechanism within the reproducing apparatus. Then, a turntable relatively rises within the inner side of the supporting mechanism, and the disc is placed onto and is unitarily rotated with the turntable, to perform the reproduction. After completion of the reproduction, when the empty jacket is inserted into the reproducing apparatus, the disc is relatively inserted into the jacket together with the annular portion of the tray, and the engagement of the engaging means is released. Accordingly, when the jacket is pulled out from the reproducing apparatus, the disc and the tray is obtained outside the reproducing apparatus together with the jacket in a state in which the disc and the tray is incased inside the jacket.

Thus, in the above disc case, for use with the conventional reproducing apparatus, the peripheral side surface of the disc is held by the engaged annular portion of the tray and the disc remains within the reproducing apparatus upon pulling of the jacket outside the reproducing apparatus. Accordingly, a supporting mechanism which is placed with the remaining disc thereon and supports the other peripheral edge part of the disc, is provided in the reproducing apparatus. Hence, the turntable must be constructed so as to relatively move up-and-down within the inner side of the supporting mechanism. This means that the diameter of the turntable must be smaller than the diameter of the disc, and the outer peripheral edge part of the turntable thus makes contact with and supports the disc at the signal recording surface which is to the inner side of the outer peripheral edge part of the lower disc surface. Therefore, scratches are easily made on the signal recording surface part of the disc which is supported by the turntable, and especially when starting the rotation of the turntable, suffers a disadvantage in that scratches are more easily made in this case due to a force acting in a direction so as to rub the disc. Accordingly, when the disc is used many times, fine reproduction cannot be obtained due to the above scratches formed on the signal recording surface of the disc.

Moreover, upon reproduction, when a reproducing transducer of the reproducing apparatus moves to the position of the signal recording surface on the disc surface, the reproducing transducer must traverse over the annular portion of the tray. This traversing movement accordingly leads to a disadvantage in that the reproducing transducer moving mechanism must be designed so that the reproducing transducer does not collide with the annular portion, and the construction of the mechanism thus becomes complex.

Accordingly, in U.S. patent application Ser. No. 231,868, filed on Feb. 5, 1981 and entitled "DISC-SHAPED RECORDING MEDIUM REPRODUCING APPARATUS", now U.S. Pat. No. 4,352,174, in which the assignee is the same as that of the present application, a reproducing apparatus was proposed which cooperates with a disc case having a jacket which has a space for accommodating a disc and an opening for allowing the disc to go in and out of the jacket, and a lid member inserted through the opening of the jacket for closing the opening of the jacket, where the reproducing apparatus comprises an inserting opening through which the case is inserted, a turntable for rotating the disc, holding means for holding at least one of the disc and the lid member provided at an innermost part on the opposite side from the inserting opening with respect to the turntable, lowering and raising means for lowering the disc to a position where the disc is placed on the turntable from a holding position where the disc is held by the holding means upon starting of the reproduction and raising the disc to the holding position from the turntable upon finishing or discontinuing of the reproduction, a reproducing transducer for reproducing the disc placed on the turntable, and moving means for moving the reproducing transducer from a waiting position to a reproducing position with respect to the disc.

On the other hand, this reproducing apparatus is adapted so that a disc lifter, responsive to insertion of the disc case, moves downwards to retreat from the disc case insertion passage and, responsive to pulling-out of the disc case, moves again upwards to support the disc left inside the reproducing apparatus at a position above the turntable. A mechanism for ascending and decending the disc lifter has a construction wherein a long cam plate is extended along the entire length of the disc insertion passage so as to cooperate with a slider moving along the guide rail due to insertion of the disc case. Inasmuch as the disc case is inserted into the reproducing apparatus, the above cam plate is kept to be engaged with the slider and is held at a rotated position thereof, which causes the disc lifter to be kept at a descended position, retreating from the insertion passage of the disc case. When the disc case is pulled out from within the reproducing apparatus, the cam plate is released from engagement with the slider thereby to rotate to the original state, thus elevating the disc lifter. Accordingly, the mechanism for moving the disc lifter upwards and downwards becomes unfavorably large size, thus being difficult to construct in a form of sub-assembly structure.

SUMMARY OF THE INVENTION

Accordingly, a general object of the present invention is to provide a novel and useful disc-shaped recording medium reproducing apparatus in which the above described problems have been eliminated.

Another and more specific object of the present invention is to provide a disc-shaped recording medium reproducing apparatus which is additionally provided with a lock mechanism for an elevating lever which rotates due to the insertion of the disc case thereby to move a disc lifter downwards. According to this invention, the disc lifter elevator mechanism become of small size, whereby sub-assembly structure of this mechanism becomes possible.

Further objects and features of the present invention will be apparent from the following detailed description when read in conjunction with the accompanying drawings.

DETAILED DESCRIPTION

Figure 1:
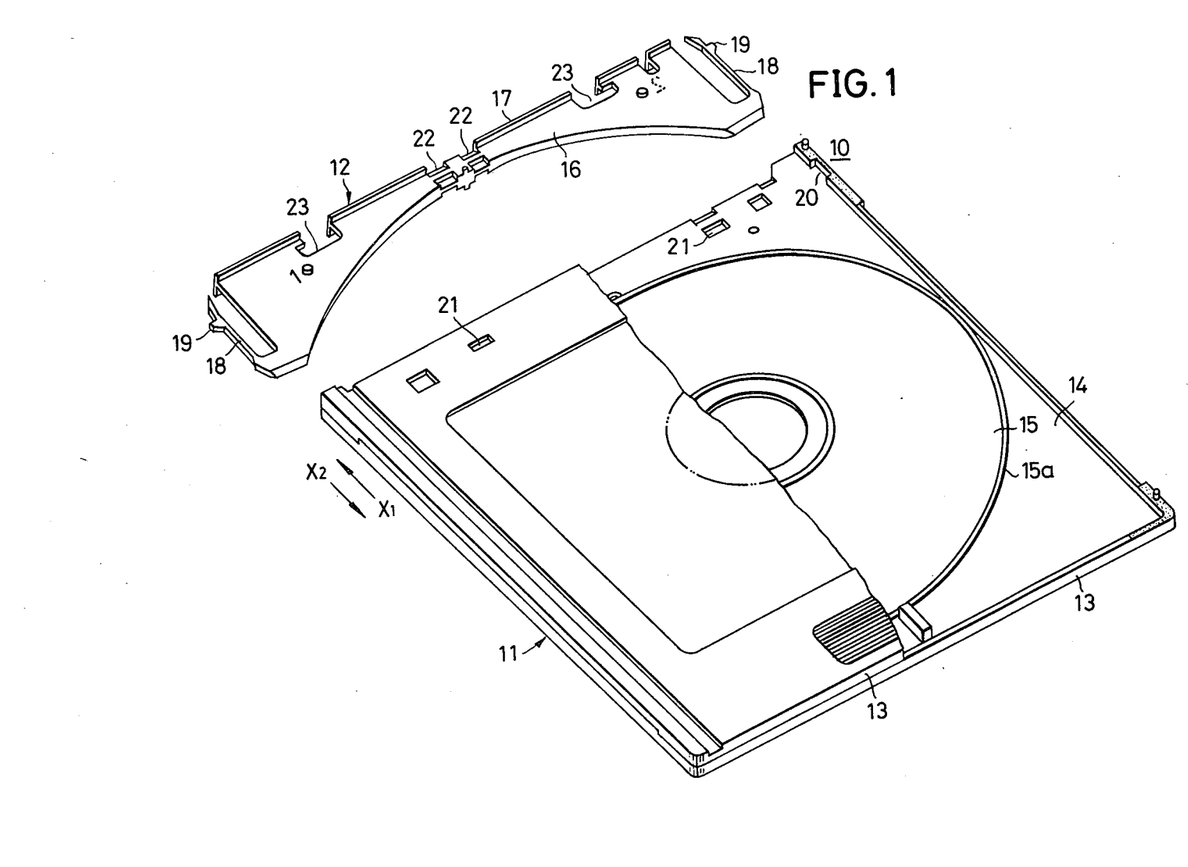
FIG. 1 is a perspective view showing an example of a disc case which operates together with a disc reproducing apparatus according to the present invention, with a part cut away and disassembled.

FIG. 1 shows an example of a disc case which operates together with a disc reproducing apparatus of the present invention, where a disc case 10 comprises a jacket 11 and a lid plate 12.

The jacket 11 is assembled from a pair of jacket halves 13 and 13, and comprises a flat cavity or space 14 therein. This space 14 accommodates a disc 15. The lid plate 12 comprises a plate-shaped main lid body 16, and a rim portion 17 formed unitarily at the front edge of the main lid body 16. A pair of engaging arms 18 are formed on both sides of the main lid body 16. The main lid body 16 of the lid plate 12 is inserted into a predetermined position within the jacket 11. Moreover, a projection 19 of the engaging arm 18 engages into a depression 20, and thus, the lid plate 12 engages with the jacket 11.

Figure 2:
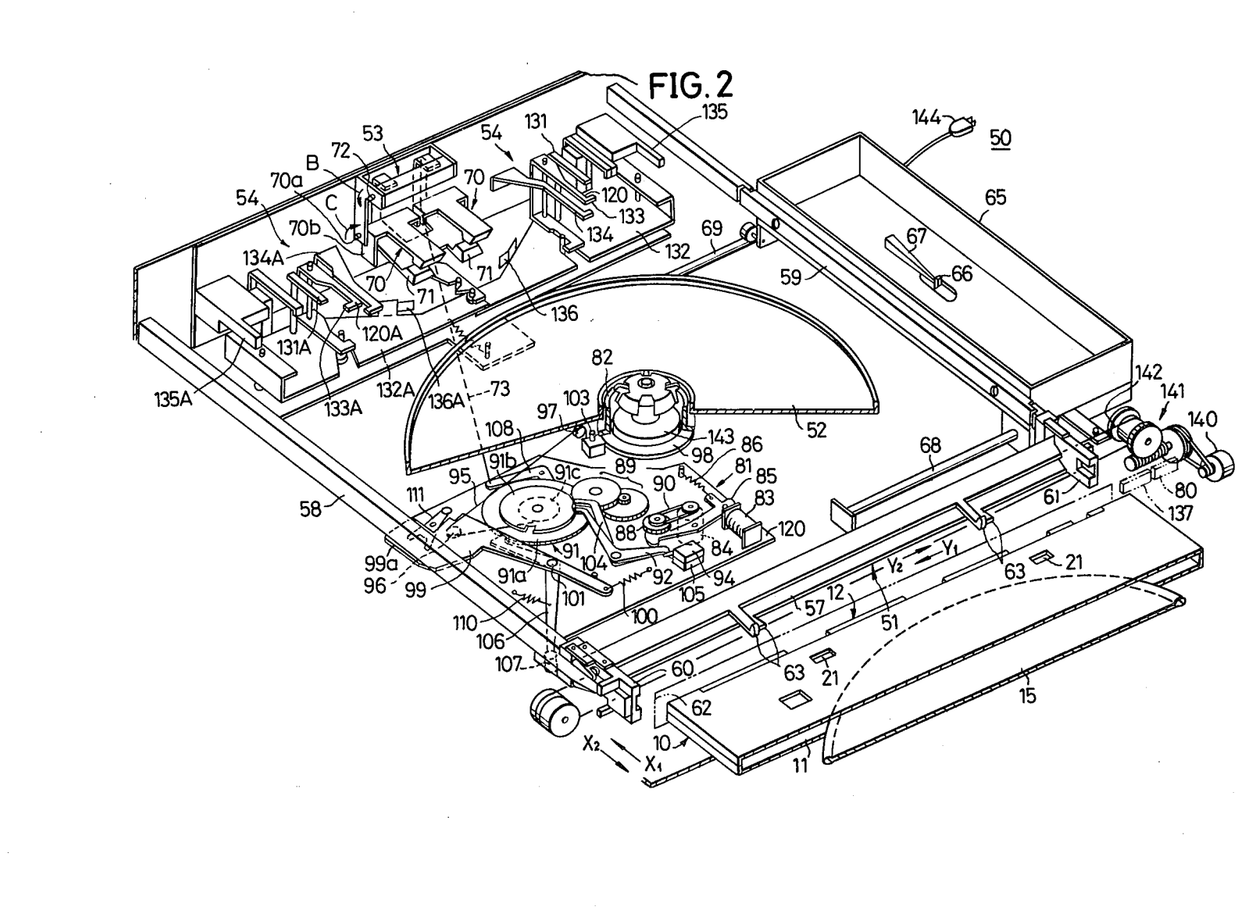
FIG. 2 is a perspective view showing the inner construction of a disc reproducing apparatus according to the present invention, with a part cut away.

A reproducing apparatus 50, shown in FIG. 2, is designed so that its basic state is that the disc lifter was descended to its final position, and for every insertion of the disc case, a loading-eject button is pushed to operate an elevator motor thereby to move the disc lifter upwards.

The reproducing apparatus 50 substantially comprises a jacket opening enlarging mechanism 51, a turntable 52 to rotate the disc 15 positioned thereon, the disc holding mechanism 53 for clamping the disc 15, a lid plate locking mechanism 54 for locking the lid plate 12, and the like.

The jacket opening enlarging mechanism 51 comprises upper and lower beams 56 and 57 extending in the directions of the arrows Y1 and Y2, and sliders 60 and 61 which are respectively fixedly inserted into guide rails 58 and 59, to support both ends of the respective beams 56 and 57 and to move along the guide rails 58 and 59. The jacket opening enlarging mechanism 51 is guided by guide rails 58 and 59, and moves between the innermost part of the reproducing apparatus 50 and a disc case inserting opening 62 provided at the frame of the reproducing apparatus 50, in the directions of the arrows X1 and X2.

Enlarging fingers 63 are respectively formed on each of the beams 56 and 57, directed towards the inserting opening 62. When each of the beams 56 and 57 are positioned on the side of the inserting opening 62, the enlarging fingers 63 mutually close upon each other, and when the beams 56 and 57 move in the direction of the arrow X1, the enlarging fingers 63 rotate in upward and downward directions so as to mutually separate from each other.

A pickup frame 65 is provided with a reproducing stylus 66 and a cantilever 67, and moves in the directions of the arrows Y1 and Y2 along a pair of guide rods 68 and 69.

The disc holding mechanism 53 and the lid plate locking mechanism 54 are constructed symmetrically on the left and right sides with respect to a line which passes through the center of the turntable in the direction of the arrow X1. The parts on the left side are designated by the same reference numerals as the corresponding parts on the right side, with a subscript "A", and their description will be omitted.

The disc holding mechanism 53 is provided at the inner part of the reproducing apparatus 50 on the opposite side of the inserting opening 62, and comprises a pair of upper and lower holding fingers 70 and 71. The lower holding finger 71 is axially supported on an upper pin 72. A wire 73 is linked to the holding finger 71, and the holding finger 71 receives a rotational force in the direction of arrow B due to the force of a spring 74. Accordingly, the holding finger 71 receives a force urging rotation in the upward direction. The upper holding finger 70 is axially supported by a pin 70a.

Upon reproduction of the disc 15, the disc case 10 is inserted through the inserting opening 62 of the reproducing apparatus 50, by inserting the disc case 10 with the side of the lid plate 12 into the direction of the arrow X1.

Figure 3:
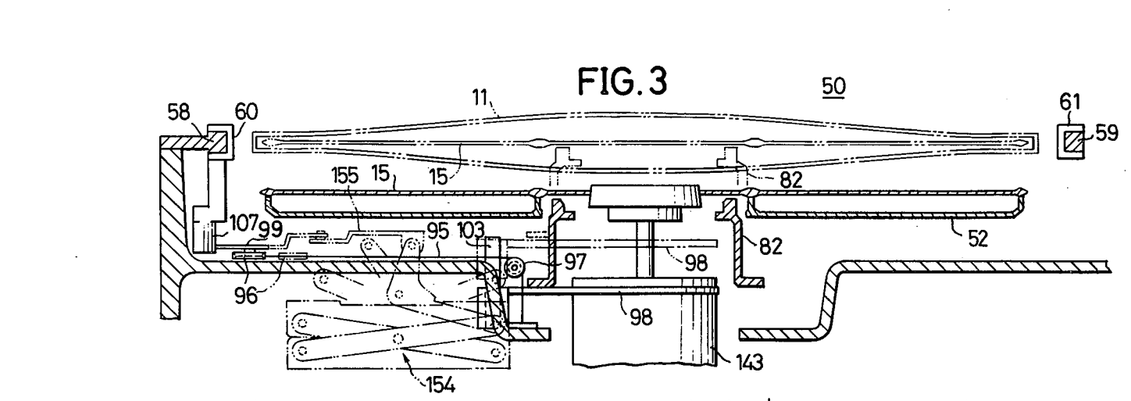
FIG. 3 is a schematic elevation, in vertical section, of the apparatus of FIG. 2.

Upon insertion of the disc case 10, an loading-eject button 80 is pushed. Responsive to this operation, a disc lifter elevator mechanism 81 changes from a state indicated in FIGS. 2 and 4, by way of a state indicated in FIG. 5, to a final state indicated in FIG. 6. In the beginning, a disc lifter 82 (disc supporting member) is being at a descended position, that is, at a position of capable of reproducing the disc, as shown in FIGS. 2 and 3. When the button 80 is pushed, a plunger 83 is energized, and a elevator motor 84 begins to rotate. When the plunger 83 is energized, a rotatable lever 85 rotates clockwise about a pin 87 counter to a spring 86, and hence a gear 88 supported on the lever 85 is brought into mesh with reduction gears 89. This gear 88 rotate: clockwise by means of the elevator motor 84 by way of a belt 90. The rotation of the gear 88 is transmitted by way of the reduction gears 89 to a gear part 91a of a cam-gear structure 91, which thereby rotates counterclockwise at a reduced speed.

When the cam-gear structure 91 rotates over about 140 degrees, a beak at the end of a first switch arm 92 enters into a first depression 91b-1 of a disc cam 91b, and this arm 92 rotates counterclockwise about a pin 93 thereby to render a first microswitch to be turned OFF. By the turning OFF of this microswitch 94, the elevator motor 84 is cut off from the power source and stops rotation. This motor 84 thus being stopped then serves as a load against the reverse rotation of the cam-gear structure 91, which is thereby maintained to be stopped at the rotated position.

As the cam-gear structure 91 rotates, a wire 95 is taken up on a reel 91c. The wire 95 is tensioned and guided by pulleys 96 and 97, and is linked to an U-shaped elevator plate 98 resting at a descended position thereof. The pulley 96 is provided on a lifter elevating lever 99, which is being urged to rotate counterclockwise about a pin 101 by a spring 100 and is engaged with a stopper pin 102. As the wire 95 is taken up on the reel 91c, the elevator plate 98 is pulled upwards and moves upwards along the guide post 103, and hence the disc lifter 82 is pushed upwards to a position capable of supporting the disc as indicated by two-dot chain line in FIG. 3.

A beak of a second switch arm 104 slips out from a second depression 91b-2 of a disc cam 91b. The arm 104 rotates clockwise to cause a second microswitch 105 to be turned ON. Now, the first microswitch 95 is in OFF and the second microswitch 105 is in ON, which makes it possible for a micro computer to recognize that the disc lifter 82 is at the elevated disc supportable position.

The cam-gear structure 91 is now at the rotational position where a depression 91a-1 of the gear 91a confronts a beak 106a of a lifter lock lever 106. At this moment, the lifter lock lever 106 is engaged at the other end 106b by a cylindrical pin member 107 projected downward from the slider 60 which is positioned at the front side of the apparatus 50, so that the beak 106a does not enter into the depression 91a-1. Furthermore, a cam 91d rotates an L-shaped clamp control arm 108 counterclockwise about a pin 109, and hence a wire 73 is pulled to cause the holding fingers 70 and 71 to assume the state of capable holding the disc.

When the reproducing apparatus 50 is assuming the above described state, the disc case 10 is inserted into the apparatus 50. By this insertion of the disc case 10, the jacket opening enlarging mechanism 51 is pushed and moved in the direction of the arrow X1 by the disc case 10. When the enlarging mechanism 51 moves, the upper and lower beams 56 and 57 rotate, and the enlarging fingers 63 thus respectively move in a direction to mutually separate from each other. Accordingly, the tip ends of the enlarging fingers 63 engage with engaging windows 21 of the jacket 11, and enlarge the front part of the upper and lower jacket halves 13 upwards and downwards, to enlarge the opening.

Additionally, as the disc case 10 is inserted, the pin member 107 moves from a position indicated in FIG. 2 in the direction of the arrow X1. When the pin member 107 moves from the original position, the lifter lock lever 106 is released from the engagement by the pin member 107 and hence rotates clockwise by a spring 110, whereby the beak 106a enters into the depression 91a-1 thereby to lock the cam-gear structure 91 at this rotational position. The end part 106b of the lifter lock lever 106 enters into a path 112 of the pin member 107.

Figure 6:
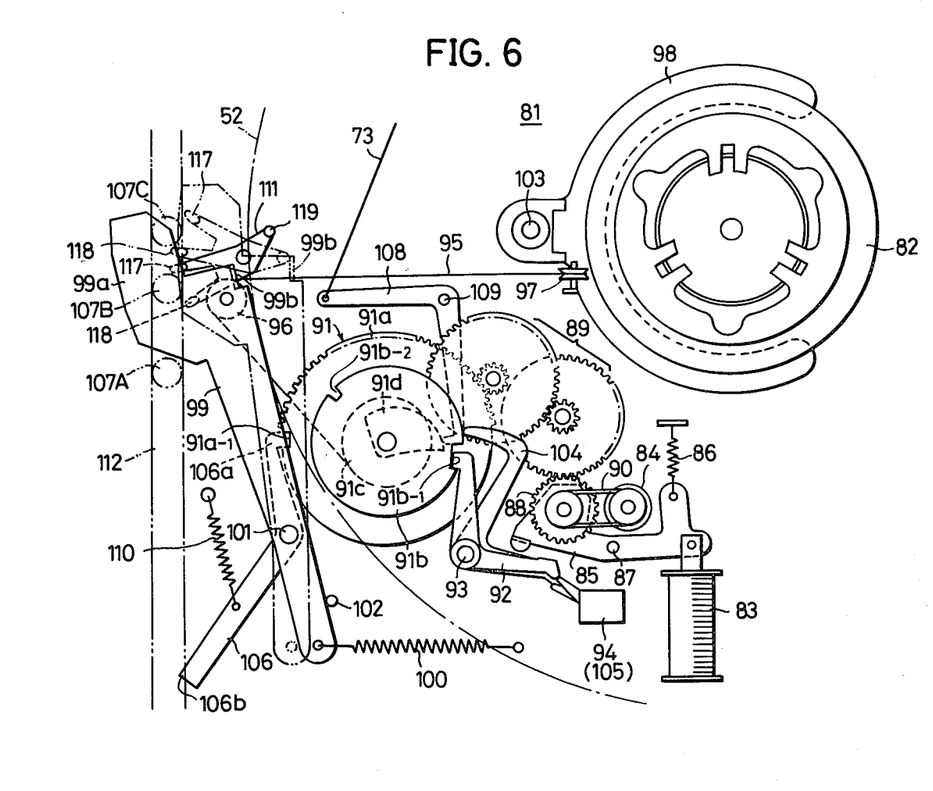

This pin member 107 moves alongs the moving passage 112 as indicated by 107A→107B→107C in FIG. 6. When the pin member 107 moves, it makes contact with and pushes aside a cam part 99a of the lifter elevating lever 99 to rotate the same clockwise counter to a spring 100 up to a position indicated by two-dot chain lines in FIG. 6, and the lever 99 is then locked by a lock lever 111.

Accompanied by the rotation of the lever 99, the pulley 96 shifts to a position indicated by two-dot chain line in FIGS. 3 and 6, and the wire 95 is slacked off, and both the disc lifter 82 and the elevator plate 98 accordingly move downwards due to the weight thereof thereby retreating from the disc insertion passage. This disc lifter retreating operation is accordingly performed without rotating the elevator motor 84 in the reverse direction.

Figure 7A:
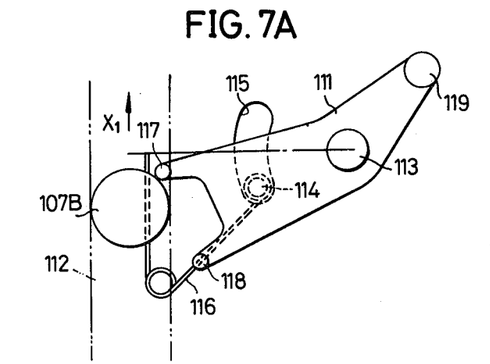
FIGS. 7A and 7B are plan views, on large scale, respectively showing a mechanism for locking a disc lifter elevating lever, in a state before locking and in a state after locking has been effected.
Figure 7B:
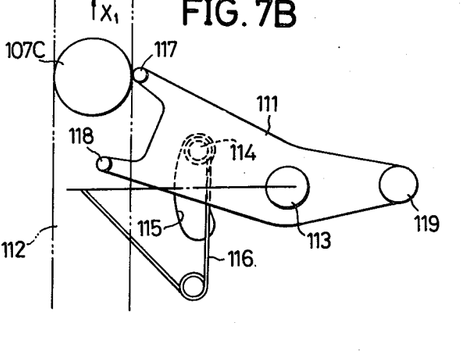

As indicated in FIGS. 7A and 7B, on large scale, the lock lever 111 is of Y-shape structure and is pivoted on a pin 113, and has a pin 114 projecting downwards to fit into a slot 115 format on a sub-chassis 120 described below. A torsion spring 116 is provided, with one arm and the other arm thereof respectively linked to the sub-chassis 120 and the pin 114. The lock lever 111 accordingly undergoes rotation to assume two positions indicated in FIGS. 7A and 7B and does not stop intermediate position therebetween. At each rotational position of the lock lever 111, either a pin 117 at the tip of one arm or another pin 118 on the other arm of the lock lever 111 enters into the pin member moving path 112. The lock lever 111 has a lock pin 119 at a leg part thereof. Before the disc case is inserted, the lock lever 111 assumes the position rotated counterclockwise, and the pin 117 is within the path 112, as indicated in FIG. 7A. As the disc case 10 is inserted, this pin 117 is pushed off or kicked off by the pin member 107 moving in the direction of the arrow X1 to forcibly rotate the lock lever 111 to assume the rotational position indicated in FIG. 7B. By this rotation of the lock lever 111, the lifter elevator lever 99 is engaged at a bent lug 99b thereof by the lock pin 119, and is accordingly locked at the position rotated clockwise. The pin 117 retreats from the path 112 and therefor the pin 118 enters into the path.

With this construction of locking the lifter elevating lever 99 at the rotated position thereof, it is not necessary for the lifter elevating lever to extend over the whole length of the disc case insertion passage but is suffient only to confront a part of this passage. Therefore, the length of the lifter elevating lever becomes much shorter, which makes the disc lifter elevator mechanism 81 small size by that much, thus allowing the lifter elevator mechanism 81 to be assumed on the sub-chassis 120 in a form of sub-assembly mechanism. This affords advantageous features such that much improvement on assembling operation of the reproducing apparatus 50 is ensured.

Referring back to FIG. 2, when the disc case 10 is inserted into the inner-most part of the reproducing apparatus 50 together with the enlarging mechanism 51 through the upper side of the turntable 52, ride-over parts 22 of the lid plate 12 enter between the holding parts which are positioned mutually opposite to the holding fingers 70 and 71, and pass through these holding parts by pushing and spreading these parts. The holding fingers 70 and 71 close, as will be described hereinafter, after the ride-over parts 22 of the lid plate 12 have passed through, and the holding parts accordingly clamp a groove guard 15a of the disc 15.

Accompanied by the insertion of the disc case 10, locking fingers 130 and 130A relatively enter inside L-shaped cutouts 23 of the lid plate 12, and the rim portion 17 accordingly pushes contact fingers 131 and 131A. When the contact fingers 131 and 131A are pushed by the lid plate 12, main levers 132 and 132A respectively rotate to be latched. Furthermore, the locking fingers 130 and 130A rotate in directions so as to mutually separate from each other, and L-shaped parts 133 and 133A provided at the tip ends of the above locking fingers 130 and 130A respectively enter into the innermost parts of the cutouts 23, to lock the lid plate 12. The lid plate 12 is limited of its movement in the direction of the arrow X1 by the contact fingers 131 and 131A, and the lid plate 12 is thus locked and supported at the innermost part of the reproducing apparatus 50 in a state in which the lid plate 12 is placed and supported on supporting fingers 134 and 134A.

Furthermore, engagement releasing members 135 and 135A enter inside the openings on the right and left sides of the disc case 10, and push the sloping surfaces at the tip ends of the engaging arms 18. Accordingly, the engaging arms 18 are respectively distorted inwards, and the projections 19 respectively slip out from the depressions 20, to release the engagement of the lid plate 12 with respect to the jacket 11.

When the main levers 132 and 132A rotate to positions where they are latched, the leaf springs 136 and 136A respectively provided at the bent parts of the main levers push against a vertically extending part 70b of the upper holding finger 70. Hence, a rotational force in the direction of the arrow C is applied to the holding finger 70. Thus, the disc 15 is held at a predetermined height by the lower holding finger 71 and the upper holding finger 70.

Accordingly, when the disc case 10 is inserted into the final position, the engagement of the lid plate 12 with respect to the jacket 11 is released, and the disc 15 thus becomes locked by the locking fingers 120 and 120A, and held by the holding fingers 70 and 71.

Next, the jacket 11 is pulled out in the direction of the arrow X2. Since the lid plate 12 and the disc 15 are respectively locked and clamped as described above, only the jacket 11 is moved in the direction of the arrow X2, leaving behind the lid plate 12 and the disc 15. Accompanied by this pulling out of the jacket 11, the lid plate 12 and the disc 15 are relatively pulled out from within the jacket 11.

Accompanied by the movement of the jacket 11 in the direction of the arrow X2, the jacket opening enlarging mechanism 51 also moves together with the jacket in the direction of the arrow X2.

When the jacket 11 is pulled out halfway, the pin member 107 moving in the direction of the arrow X2 pushes the pin 118 aside to rotate the lock lever 111 counterclockwise to assume positively the position indicated in FIG. 7A. The lifter elevating lever 99 is accordingly released from leaked state, and rotates counterclockwise by the force of the spring 100. Accompanied by rotation of the lever 99, the wire 95 is pulled, and the disc lifter 82 again moves up to the disc supportable position thereby to supports the center part of the disc 15. In this state, the disc 15 is supported horizontally at a position above the turntable 52, by the holding fingers 70 and 71 and the disc lifter 82. When the jacket 11 is further pulled out, the disc 15 completely separates from the jacket 11, the jacket opening enlarging mechanism 51 returns to its original position, and the jacket opening enlarging fingers 63 rotate in directions so as to mutually close upon each other and separate from the engaging windows 21. The jacket 11 returns to its original state due to its flexibility, and the enlarged opening also returns to the original state, and the jacket 11 is completely pulled out from the reproducing apparatus 50.

Figure 4:
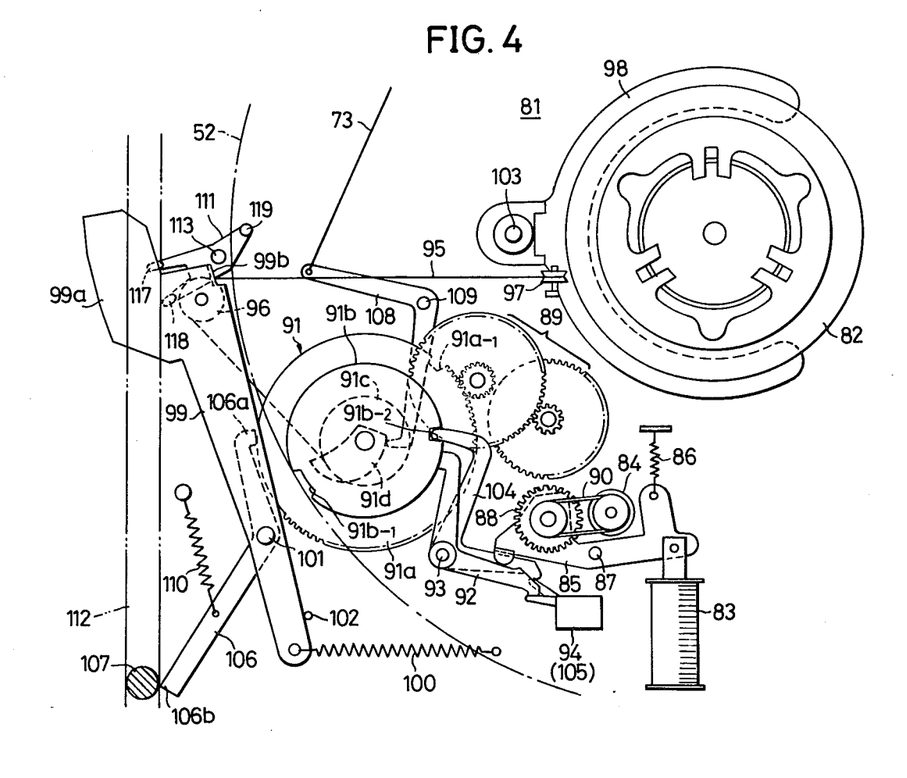
FIGS. 4, 5 and 6 are plan views respectively showing one embodiment of a disc lifter elevator mechanism shown in FIG. 2, in a state before insertion of the disc case, in a state when a loading-eject button is operated upon inserting the disc case, and in a state where the disc lifter has elevated so as to allow insertion of the disc case.
Figure 5:
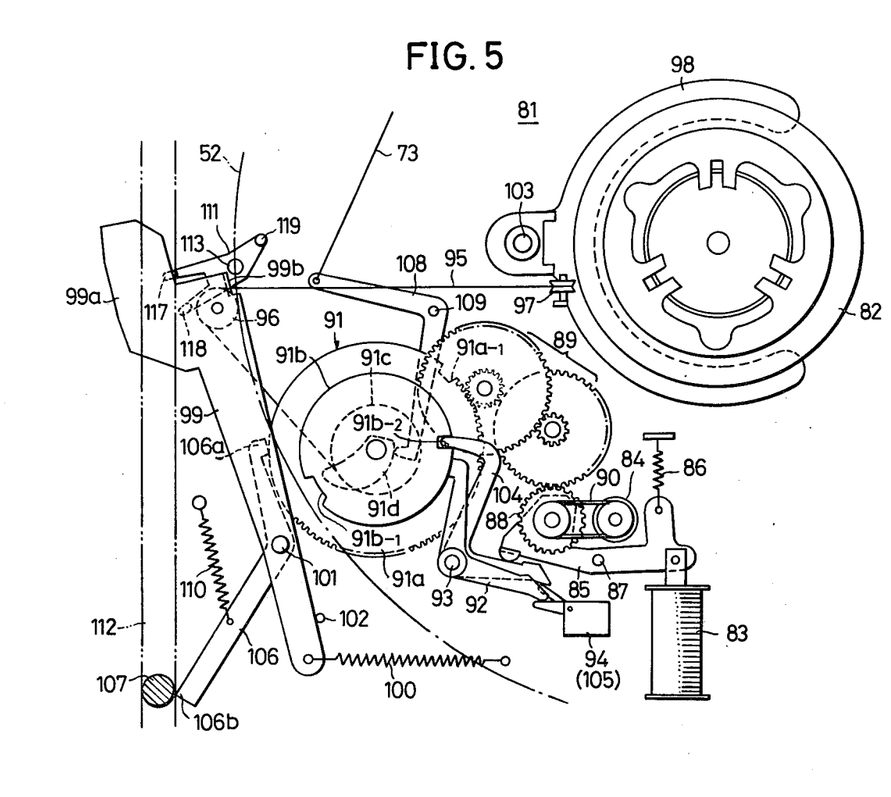

Whereupon the slider 60 returns into the original position, the pin member 107 pushes aside the end part 106b of the lifter lock lever 106, which thereby rotates to assume the original state indicated in FIGS. 4 and 5, where the beak 106a is slipped off from the depression 91a-1. The cam-gear structure 91 is accordingly released from locked stated by the lever 106.

Then, a play button 137 is pushed. Responsive to this operation, the elevator motor 84 begins to rotate in reverse, and the cam-gear structure 91 rotates clockwise from the position indicated in FIG. 6 up to the original position indicated in FIG. 5, where the cam-gear structure 91 is locked by a beak part at the tip of the rotatable arm 104 entered into the depression 91b-2. The rotatable arms 92 and 104 now assume the state indicated in FIG. 5, and the microswitch 94 and 105 are changed over, and hence the motor 84 stops and the plunger 83 is deenergized. As a result of the rotation of the cam-gear structure 91, the control arm 108 rotates clockwise to slacken the wire 73. Accordingly, the holding finger 71 rotates in a direction opposite to the direction of the arrow B, to release the clamping with respect to the disc 15. As another result of the rotation of the cam-gear structure 91, the wire 95 is pulled out from the reel 91c, and the disc lifter 82 moves downwards. Accordingly, the disc 15 moves down and is placed on the turntable 52.

Furthermore, a motor 140 begins to rotate to cause, by way of warm gears 141, a wire belt 142 to travel. Accordingly, the pickup frame 65 moves in the direction of the arrow X1 from the waiting position. Furthermore, the turntable 52 is rotated by a motor 143. Thus, the disc 15 is relatively scanned by the reproducing stylus 66, to reproduce the information signal.

Next, an operation in which the disc 15 is recovered from within the reproducing apparatus 50, will now be described.

When the loading-eject button 80 is pushed during the reproducing mode of operation, the motor 143 stops to stop the rotation of the disc 15, and the motor 140 rotates in reverse to return the pickup frame 65 into the waiting position. Further, the plunger 83 is energized and the elevator motor 84 starts, and hence the disc elevator mechanism 81 and the disc holding mechanism 53 operate, similarly as in the preceding disc loading mode. That is, the disc 15 is clamped at the groove guard 15a by the disc holding mechanism 53, and is supported on the disc lifter 82 at the position above the turntable 52.

Upon recovering of the disc 15, the empty jacket 11 is inserted with its front end first into the reproducing apparatus 50 through the inserting opening 62. The jacket opening enlarging mechanism 51 is pushed by the jacket 11 and moves again in the direction of the arrow X1, to enlarge the opening of the jacket 11. Accompanied by the insertion of the jacket 11 in the direction of the arrow X1, the disc 15 is relatively inserted inside the jacket 11 through the opening.

When the jacket 11 is inserted into the innermost position inside the reproducing apparatus 50, the disc 15 becomes completely increased within the jacket 11, and furthermore, the locked lid plate 12 is relatively inserted within the opening of the jacket 11.

When the jacket 11 is inserted into the final position, the disc 15 is accompanied within the jacket 11, and the main part of the lid plate 12 which has been locked, is inserted inside the jacket opening.

Therefore, when the jacket 11 is pulled out in the direction of the arrow X2, the lid plate 12 then moves in the direction of the arrow X2 together with the jacket 11, and the disc 15 is pushed by the lid plate 12 and forcibly pushed out in the direction of the arrow X2 by the holding part. Accordingly, the disc 15 separates from the reproducing apparatus 50 to be recovered within the disc case 10.

Accompanied by the moving of the enlarging mechanism 51, the lifter elevating lever 99, the lifter lock lever 106, and the lock lever 111 operates, similarly as in the preceding case of disc loading operation. Upon the elapse of time, after the enlarging mechanism 51 has returned into the original position, the elevator motor 84 rotates in reverse direction, and the disc lifter elevator mechanism 81 changes from the state indicated in FIG. 6 and assumes the state indicated in FIG. 5. After the disc lifter 82 has completed downward movement, the motor 84 stops and the plunger 83 is deenergized. The disc lifter elevator mechanism 84 now assumes the original states as indicated in FIG. 4.

In this reproducing apparatus 50, if the disc lifter 82 decends either during the disc loading operation or during the disc recovering operation, the disc 15 would not be supported at the normal position, resulting in that the disc loading and recovering operation cannot be performed normally. On the other hand, due to the characteristics of the above reproducing apparatus 50, the reproducing apparatus 50 involves any possibility that the disc lifter 82 tends to descend when supply of power current to the reproducing apparatus 50 is cut off.

Next to be described is how the disc lifter 82 is maintained at the elevated position even in a case where power supply to the reproducing apparatus is cut off during the disc loading or recovering operation is performed.

In such cases where a plug 144 is pulled out from a power terminal, or where the failure of power supply occurs, power supply to the reproducing apparatus 50 is cut off and the plunger 83 is instantaneously deemergized. When the plunger 83 is deemergized, as indicated in FIG. 4, the lever 85 rotates counterclockwise by the force of the spring 86, and the gear 88 separates from the reduction gears 89, and hence the load against the returning rotation of the cam-gear structure 91 is released. Accordingly, the cam-gear structure 91 tends to rotate by the weight of the disc lifter 82 in the clockwise direction, that is, in the direction of paying out the wire 95 from the reel 91 to desend the disc lifter 82. However, when the disc loading or recovering operation is performed, the pin member 107 is at a position moved in the direction of arrow X1 from the original position indicated in FIGS. 2, 4, and 5, and hence the lifter lock lever 106 assumes the position rotated clockwise and the beak 106a has entered into the depression 91a-1, whereby the cam-gear structure 91 has been locked. Accordingly, even though the plunger 83 is deemergized, the cam-gear structure 91 does not rotate but is maintained at the original position, and hence the disc lifter 82 does not move downwards.

As a result, even though failure of power supply takes place during disc loading or recovering operation, the disc is normally loaded into the reproducing apparatus 50 and recovered into the disc case 10.

Figure 8:
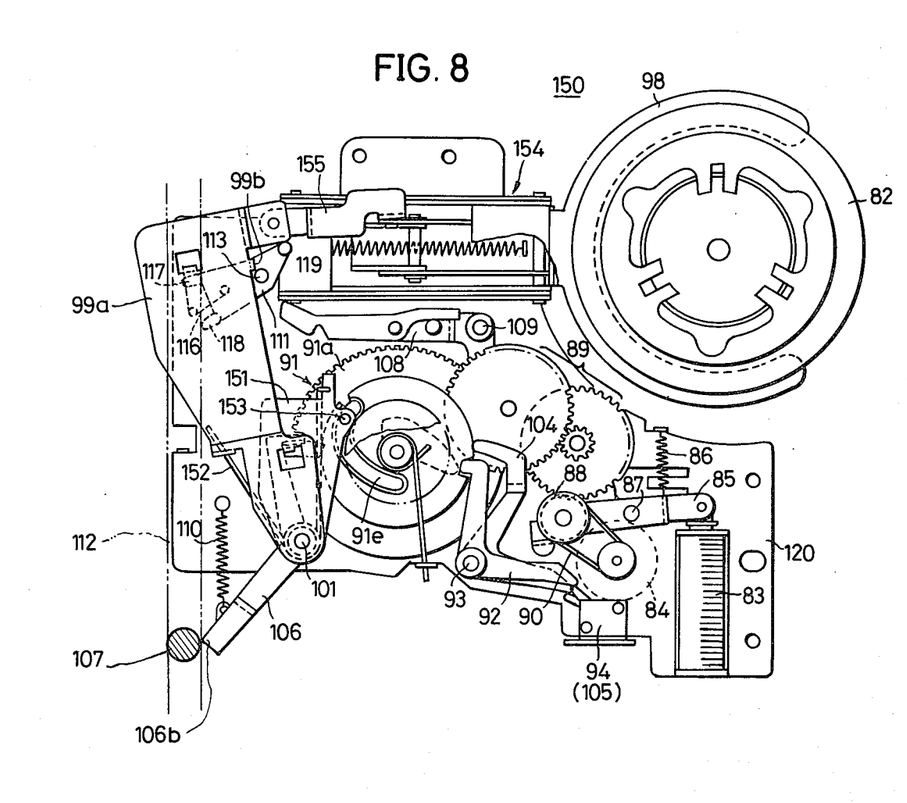
FIG. 8 a plan view, partly cut away, showing another embodiment of a disc lifter elevator mechanism in a state after the disc lifter has been elevated.

Next another embodiment of the disc lifter elevator mechanism will be described with reference to FIG. 8. FIG. 8 shows a state corresponding to the state where the disc lifter 82 has elevated in the above described embodiment as indicated in FIG. 6. Parts in FIG. 8 which have the same function as corresponding to parts in FIG. 6 are designated by like reference numerals. Detailed description of such parts will not be repeated.

A disc lifter elevator mechanism 150 is substantially the same as the above described disc lifter elevator mechanism 81, except for a lifter elevating lever, a cam-gear structure, and a disc lifter elevating mechanism.

The lifter elevating lever 99 (having no arm part where the spring 100 is hooked), and a control lever 151 are pivoted in common on the pin 101. The lifter elevating lever 99 is being urged to rotate counterclockwise with respect to the control lever 151 by a torsion spring 152. The control lever 151 has at a free end thereof a pin 153 which is fitted into a cam groove 91e additionally formed on the cam-gear structure 91, and hence rotates counterclockwise responsive to the counterclockwise rotation of the structure 91. For the elevator plate 98, is provided a so-called pantograph mechanism 154 having a pair of arm member crossed to form a letter "X" (referring to FIG. 3). The lifter elevating lever 99 and the pantograph mechanism 154 is connected by a link 155. As the cam-gear structure 91 rotates, the lifter elevating lever 99 undergoes rotation together with the control lever 151, and hence the pantograph mechanism 154 operates to move the elevator plate 98 upwards and downwards. When the disc case 10 is inserted into the reproducing apparatus 50, the lifter elevating lever 99 is pushed aside by the pin member 107 and rotates clockwise, independent of the control lever 151, counter to the torsion spring 152, and is locked by the lock lever 111. Furthermore, with the provision of the pantograph mechanism 154, the wire 95 and the reel 91c of the com-gear structure 91 are omitted.

Further, this invention is not limited to the above described embodiments, but various variations and modifications may be made without departing from the scope of the present invention.

What is claimed is:

1. A reproducing apparatus for reproducing a disc-shaped recording medium which is accommodated within a case, said case comprising a jacket which has a space for accommodating said disc-shaped recording medium and an opening for allowing said disc-shaped recording medium to go in and out of said jacket, and a lid member inserted through said opening of said jacket for closing said opening of said jacket, said reproducing apparatus comprising:

an inserting opening part through which said case is inserted into said reproducing apparatus;

a turntable for rotating said disc-shaped recording medium;

lid member locking means and disc-shaped recording medium clamping means respectively provided at the innermost part of said reproducing apparatus opposite to said inserting opening with respect to said turntable;

jacket opening enlarging means provided in the vicinity of said inserting opening, moving over said turntable between the position in the vicinity of said inserting opening and said innermost part of said reproducing apparatus, accompanied by operation of inserting said case into and pulling the same from said reproducing apparatus;

elevating means for moving a member for supporting said disc-shaped recording medium upwards and downwards independent of said turntable, said elevating means assuming a state of elevating said supporting member upon inserting said case into said reproducing apparatus;

an elevating lever member, provided in conjunction with said elevating means to assume a position entering into a passage of an engagement guide port which constitutes a part of said jacket opening enlarging means upon inserting said case into said reproducing apparatus, and engaged and pushed by said engagement guide part moving accompanied by the insertion of said case to undergo displacement in one direction, causing said elevating means to operate so as to move said supporting member downwards to retreat from an insertion passage of said case; and locking means, responsive to an insertion operation of said case, for locking said elevating lever member at the position displaced in the one direction so as not allow return displacement thereof, and, responsive to a pulling-out operation of said case, for making said elevating lever member free from locked state to allow said elevating lever to return to the original position thereof.

2. A reproducing apparatus as claimed in claim 1 in which said disc-shaped recording medium elevating means comprises a motor serving as a driving source, and a reel member to be rotated by said motor to take up a wire connected to an elevator member supporting said supporting member thereon and capable of moving upwards and downwards so as to pull said elevator member upwards, said elevating lever member having a pulley guiding said wire therearound and capable of rotating independent of said reel member.

3. A reproducing apparatus as claimed in claim 1 in which said disc-shaped recording medium elevating means comprises a motor serving as a driving source, a cam structure to be rotated by said motor, a lever mechanism consisting of first and second lever members and undergoing rotational displacement responsive to the rotation of said cam structure, and a pantograph mechanism connected to said lever mechanism for moving said supporting member upwards and downwards due to the rotational displacement of said lever mechanism, said elevating lever member being said first lever member of said lever mechanism, said first lever member being linked to said pantograph mechanism and connected by a spring member to said second lever member engaged with said cam structure and capable of undergoing rotational displacement independent of said second lever member.

4. A reproducing apparatus as claimed in claim 1 in which said locking means comprises a rotatable lock lever member having a pair of arms and a leg to be of substantially Y-shape, and a mechanism for controlling said lock lever member so as to assume only two rotational positions, said lock lever member being kicked at one arm thereof by said engagement guide part, when said case is inserted, to rotate in a direction for said leg to engage said elevating lever member which has rotated, said leg maintaining to engage with said elevating lever member, and being kicked at the other arm thereof by said engagement guide part, when said case is pulled out, to rotate in the reverse direction for said leg to release engagement with respect to said elevating lever member.

5. A reproducing apparatus as claimed in claim 2 which further comprises a mechanism operated interrelatedly with an operation of inserting said case into said reproducing apparatus to lock said reel member.

6. A reproducing apparatus as claimed in claim 2 which further comprises a mechanism operated interrelatedly with an operation of inserting said case into said reproducing apparatus to lock said cam structure.

7. A reproducing apparatus as claimed in claim 5 in which said lock mechanism comprises a depression formed on a periphery of said reel member, and a lock lever, responsive to the insertion of said case, assuming a state of capable of operating and entering into said depression.

8. A reproducing apparatus as claimed in claim 6 in which said lock mechanism comprises a depression formed on a periphery of said cam structure, and a lock lever, responsive to the insertion of said case, assuming a state of capable of operating and entering into said depression.

* * * * *